United States Patent [19]
Childers et al.

[11] Patent Number: 5,956,057
[45] Date of Patent: Sep. 21, 1999

[54] INK CONTAINER HAVING ELECTRONIC AND MECHANICAL FEATURES ENABLING PLUG COMPATIBILITY BETWEEN MULTIPLE SUPPLY SIZES

[75] Inventors: Winthrop D. Childers; Michael L. Bullock, both of San Diego, Calif.; Bruce Cowger, Corvallis, Oreg.; John A. Underwood, Vancouver, Wash.; Susan M. Hmelar, Corvallis; James E. Clark, Albany, both of Oreg.; Paul D. Gast, Barcelona, Spain; John A. Barinaga, Portland; David O. Merrill, Corvallis, both of Oreg.

[73] Assignee: Hewlett-Packard Company, Palo Alto, Calif.

[21] Appl. No.: 08/869,152

[22] Filed: Jun. 4, 1997

Related U.S. Application Data

[63] Continuation-in-part of application No. 08/785,580, Jan. 21, 1997, Pat. No. 5,812,156, and a continuation-in-part of application No. 08/789,957, Jan. 30, 1997, which is a continuation-in-part of application No. 08/706,061, Aug. 30, 1996.

[51] Int. Cl.⁶ .......................................... B41J 2/14
[52] U.S. Cl. ................... 347/49; 347/19; 347/86
[58] Field of Search ................... 347/19, 20, 21, 347/84, 85, 86, 7, 49

[56] References Cited

U.S. PATENT DOCUMENTS

| | | | |
|---|---|---|---|
| 4,568,954 | 2/1986 | Rosback | 346/140 |
| 4,974,020 | 11/1990 | Takamatsu et al. | 355/208 |
| 5,365,312 | 11/1994 | Hillmann et al. | 355/206 |
| 5,414,452 | 5/1995 | Accatino et al. | 347/7 |
| 5,506,611 | 4/1996 | Ujita et al. | 347/86 |
| 5,512,926 | 4/1996 | Uchikata et al. | 347/86 |
| 5,610,635 | 3/1997 | Murray et al. | 347/7 |

FOREIGN PATENT DOCUMENTS

| | | | |
|---|---|---|---|
| 0322131 | 6/1989 | European Pat. Off. | B41J 3/04 |
| 0374 884 | 6/1990 | European Pat. Off. | B41J 2/175 |
| 0526062 | 2/1993 | European Pat. Off. | B41J 25/34 |
| 0593282 | 4/1994 | European Pat. Off. | B41J 2/175 |
| 0626268 | 11/1994 | European Pat. Off. | B41J 25/34 |
| 0639462 | 2/1995 | European Pat. Off. | B41J 2/175 |
| 0685340 | 12/1995 | European Pat. Off. | B41J 2/175 |
| 0720916A2 | 7/1996 | European Pat. Off. | B41J 2/175 |
| 0729836 | 9/1996 | European Pat. Off. | B41J 2/175 |
| 0729845 | 9/1996 | European Pat. Off. | B41J 2/175 |
| 0741038 | 11/1996 | European Pat. Off. | B41J 2/175 |
| WO 96/34761 | 11/1996 | European Pat. Off. | B41J 2/175 |
| 08197748 | 8/1996 | Japan | B41J 2/175 |

Primary Examiner—Edgar Burr
Assistant Examiner—Dave A. Ghatt
Attorney, Agent, or Firm—Winthrop D. Childers; Kevin B. Sillivan

[57] ABSTRACT

The present invention is an ink container for use in an ink jet printing system. The printing system has a printhead under control of printing system electronics and an ink container receiving station for providing ink to the printhead. The replaceable ink container includes a plurality of container interfacing features positioned on the ink container to engage corresponding ink container receiving station interfacing features. The ink container interfacing features are disposed and arranged to allow a plurality of different sizes of the ink container to be installed at a particular location of the receiving station. The ink container also includes an information storage device that provides information indicative of a volume of ink contained in said ink container.

29 Claims, 6 Drawing Sheets

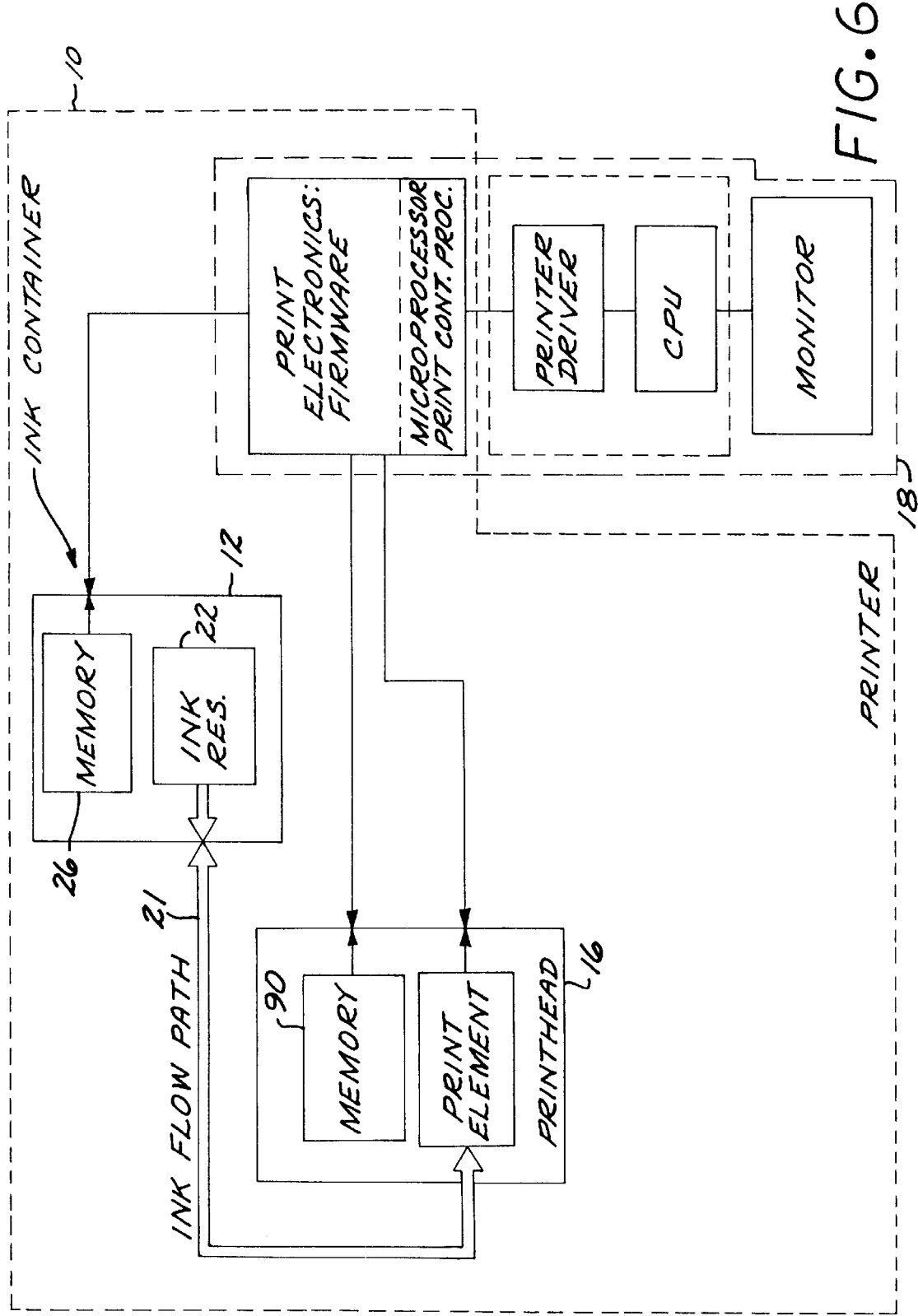

INK CONTAINER HAVING ELECTRONIC AND MECHANICAL FEATURES ENABLING PLUG COMPATIBILITY BETWEEN MULTIPLE SUPPLY SIZES

CROSS REFERENCE TO RELATED APPLICATIONS

This application is a continuation-in-part of U.S. patent application Ser. No. 08/785,580 filed Jan. 21, 1997, now U.S. Pat. No. 3,812,156 entitled "Apparatus Controlled by Data from Consumable Parts with Incorporated Memory Devices", incorporated herein by reference. This application is also a continuation-in-part of U.S. patent application Ser. No. 08/789,957 filed Jan. 30, 1997, entitled "Ink Container Configured for Use with Compact Supply Station", incorporated herein by reference and which is a continuation in part of U.S. patent application Ser. No. 08/706,061 filed Aug. 30, 1996, entitled "Ink-Jet Printing System With Off-Axis Ink Supply And High Performance Tubing", incorporated herein by reference. This application is also related to commonly assigned "Electrical and Fluidic Interface For An Ink Supply", application Ser. No. 08/791,290 filed Jan. 30, 1997, "Electrical Interconnect For Replaceable Ink Containers", application Ser. No. 08/789,958, filed Jan. 30, 1997, and "Mechanical and Electrical Keying Arrangement which Assures Compatibility of a Replaceable Ink Cartridge and a Receiving Printer", the entire contents of which are incorporated by reference herein.

BACKGROUND OF THE INVENTION

This invention relates to inkjet printers and the like and, more particularly, to an ink container having mechanical and electronic features that allow different sizes of ink containers to be plug compatible while providing an automatic and accurate way of tracking ink remaining in the ink container.

Ink-jet printers or printing systems frequently make use of an ink-jet printhead mounted to a carriage which is moved back and forth across a print media, such as paper. As the printhead is moved across the print media, control electronics activate the printhead to eject, or jet, ink droplets onto print media to form images and characters.

Some printing systems make use of an "off-carriage" or "off-axis" ink container that is replaceable separately from a high performance printhead wherein the ink container is located off of the carriage. When the ink container is exhausted the ink container is removed and replaced with a new ink container. The use of replaceable ink containers that are separate from the printhead allow users to replace the ink container without replacing the printhead and allows for larger ink supplies than would be practical on a scanning carriage. The printhead is then replaced at or near the end of printhead life and not when the ink container is exhausted. This tends to lower the average cost per printed page for the system and can decrease the frequency of ink container replacement.

Generally, the frequency of replacement of ink containers is determined by the initial volume of ink held in the ink containers and the rate of consumption of the ink. An ink container that is smaller requires more frequent ink container replacement for a given usage rate. This can be inconvenient to the user. A related problem occurs if the printer runs out of ink while printing a document. When this happens, the user must reprint at least part of the printed document. This results in wasted ink and media. With a combination of high use rate printing and small ink containers, running out of ink and reprinting documents can become a very frequent event, resulting in considerable inconvenience and waste of ink and media.

The use of a larger ink container results in a less frequent ink container replacement for a given usage rate. If the container is too large, the container may reside in the printer beyond the ink shelf life. When this happens, the user must decide between replacing the container or using the ink. Replacing the container implies throwing away unused ink. On the other hand, using old ink may damage the printhead or printer. Thus, too large of an ink container will at least negatively impact cost per printed page and/or printing system reliability.

Accordingly, it is desirable to have inkjet printing systems that conveniently, reliably, and cost-effectively accommodate a range of ink usage rates.

SUMMARY OF THE INVENTION

The present invention is a replaceable ink container for use in an inkjet printing system. The printing system has a printhead under control of printing system electronics and an ink container receiving station for providing ink to the printhead. The replaceable ink container includes a plurality of container interfacing features positioned on the ink container to engage corresponding ink container receiving station interfacing features. The ink container interfacing features are disposed and arranged to allow a plurality of sizes of the container to be installed at a particular location in the receiving station. Also, the ink container includes an information storage device that electrically couples to the printing system and provides information indicative of a volume of ink contained in the ink container.

BRIEF DESCRIPTION OF THE DRAWINGS

FIG. 6 is a block diagram of the components of the ink jet printing system illustrated in FIG. 2.

DETAILED DESCRIPTION OF THE PREFERRED EMBODIMENT

Figure 1:
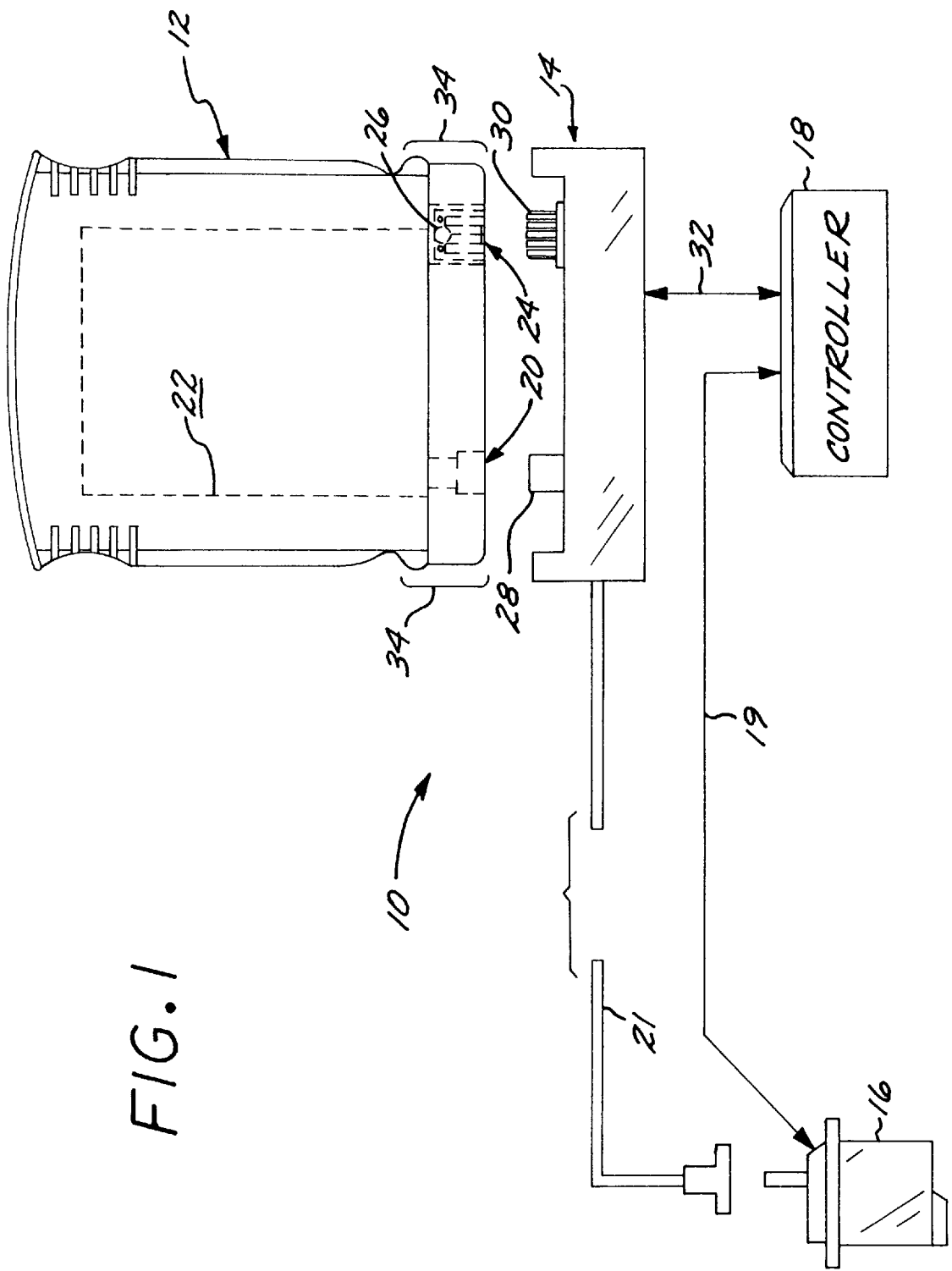
FIG. 1 shows a schematic representation of the printing system showing an ink container of the present invention which forms a fluid interconnect and an electrical interconnect with the printing system.

FIG. 1 is a schematic representation which depicts an ink-jet printing system 10 that includes an ink cartridge or ink container 12 of the present invention. The ink-jet printing system 10 also includes an ink supply station or ink container receiving station 14 for receiving ink container 12, an ink jet printhead 16 and controller or printing system electronics 18. Printing is accomplished by the printing system 10 by the ejection of ink from the printhead 16 under the control of printing system electronics 18. The printhead 16 is connected to the printing system electronics 18 by a printhead data link 19 for controlling ejection of ink. Ink is provided to the printhead 16 by way of a fluid conduit 21 which fluidically connects the printhead 16 to the receiving station 14. The ink container includes an ink outlet 20 which is in fluid communication with a fluid reservoir 22. The ink container 12 includes a plurality of container electrical contacts 24 which are electrically connected to an information storage device or memory element 26.

The ink outlet 20 and the electrical contacts 24 allow the ink container 12 to reliably interconnect with a fluid inlet 28 and receiving station electrical contacts 30, respectively, associated with the ink container receiving station 14. The receiving station 14 enables ink to be transferred from the fluid reservoir 22 associated with the ink container 12 to the printhead 16 via the fluid conduit 21. In addition, the ink container receiving station allows the transfer of information between the information storage device 26 associated with the ink container 12 and the printing system electronics 18 via a link 32.

The present invention relates to a combination of container interfacing features that allow multiple sizes of the ink container 12 to be received in receiving station 14 as well as electronic features that provide information to the printing system 10 to determine a volume of available ink in the ink container 12. By determining the volume of available ink, the printing system 10 can determine an ink level condition of ink container 12 such as a low ink or out of ink condition.

During the life of the printer, printhead 16 and ink container 12 are periodically replaced. Ink container 12 is a relatively frequently replaced component. On the other hand, printhead 16 has a lower replacement rate and can even be permanent. To avoid adding unnecessary cost per page, it is critical that printing system 10 prevent premature damage to printhead 16.

Ink container 12 is sized according to the rate of usage of ink. If the ink container is too small, it will need to be replaced frequently at a loss of convenience to the user. On the other hand, if the container is too large, it may reside in the printer for a time beyond shelf life. Beyond shelf life ink will degrade print quality or even cause permanent damage to the printhead 16 or the printing system 10.

Beyond shelf life ink can affect the printhead in a number of ways. As ink is stored, it loses volatile components, i.e., water, solvents, etc. As the concentration of non-volatile components increases, the ink can turn to sludge or even precipitate. Sufficiently old ink could completely clog the printhead 16 and/or conduit 21, requiring printhead replacement or even printer servicing. At the very least, the print quality will be degraded since the printhead is tuned to operate best with ink in a particular viscosity and surface tension range. The user may interpret any degradation in print quality as a need to replace printhead 16, ink container 12, or both.

Thus, it is desirable that the same printing system 10 address multiple use rate environments. To this end, the ink container interfacing features are disposed and arranged to allow multiple sizes of the ink container 12 to be installable or insertable at a particular location in ink container receiving station 14. The container interfacing features include the fluid outlet 20, the container electrical contacts 24, and a plurality of container positioning features 34 that engage corresponding receiving station positioning features (not shown) to be discussed in more detail later.

Activating printhead 16 without an adequate supply of ink from container 12 can result in printhead damage. To prevent this, the present invention includes information storage device 26 that provides information to the printing system electronics 18 indicative of an available volume of ink contained in ink container 12. This parameter is preferably updated periodically. If the parameter is indicative of an out of ink condition in ink container 12, the printing system electronics 18 takes action such as halting printing to avoid damage to printhead 16.

Figure 2:
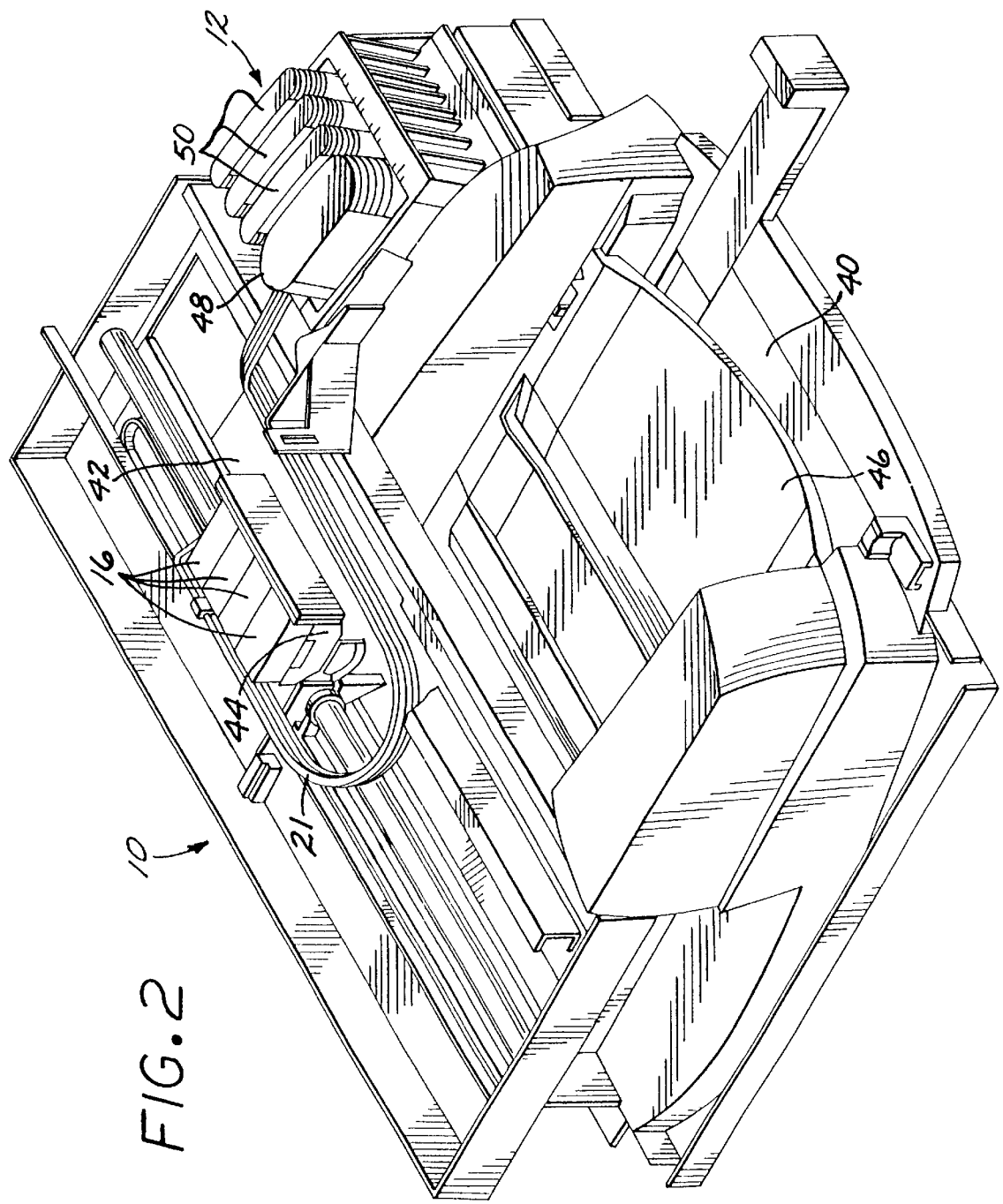
FIG. 2 is a perspective view of a printer with cover removed, which incorporates the ink container of the present invention.

Turning to FIG. 2, one embodiment of printing system 10 is depicted. Shown is a printer 10, with its cover removed, containing a plurality of ink containers 12. Printer 10 includes a tray 40 for holding a supply of media, such as paper. When a printing operation is initiated, a sheet of media from tray 40 is fed into printer 10, using a sheet feeder (not shown). During printing, media sheets pass through print zone 42 whereupon a scanning carriage 44 containing one or more printheads 16, is scanned across the sheet for printing a swath of ink thereon. The sheet of paper is stepped through the print zone 42 as the scanning carriage 44 prints a series of swaths of ink to form images thereon. After printing is complete, the sheet is positioned in an output tray 46 and the process repeats.

As printheads 16 eject ink onto media, they are replenished by conduits 21 that are fluidically connected to ink containers 12. Ink containers 12 are periodically replaced with a frequency determined by the initial volume of deliverable ink and a usage rate. Ink containers 12 are called "off-carriage" because they are located in stationary ink supply station 14 off the scanning carriage 44. This configuration allows for larger ink containers than would be practical on carriage 44. Ink containers can therefore be sized as large as user needs dictate.

The illustrated printing system is a general purpose printer such as one to be used in a typical office or home environment. This printing system 10 accepts ink containers of varying sizes and volumes to accommodate varying rates of ink usage. In the illustration shown, a relatively larger ink container 48 containing a higher use rate colorant is provided along with a plurality of smaller ink containers 50 containing lower use rate colorants. The volumes of each colorant are selected to be large enough to minimize the replacement frequency and small enough to avoid exceeding the shelf life given the particular printer application.

A more specific printer example is the following: Black is the higher use rate colorant for container 48 and each of cyan, yellow, and magenta inks are lower use rate colorants within ink container 50. In this example, the black ink container would have a 70–80 cc volume to accommodate very frequent text printing in an office environment and the color ink containers would each have a 20–30 cc volume to accommodate lower use rate color printing to occasionally highlight documents. This same printer can also be used in a home environment wherein the text printing frequency is much lower. For this lower use rate situation, a smaller 20–30 cc black ink container 48' (not shown) would be preferred. Accordingly, ink containers 48 and 48' are adapted to be insertable or installable at the same location in printer 10. In addition, ink containers 48 and 48' each have information storage devices that allow the printing system 10 to determine the available ink in each of ink containers 48 and 48' to avoid printing after an out of ink condition.

The above specific example is only illustrative of one specific application of the invention to black text printing. For example, there may be color ink containers 50', each of which is installable in the same location as a color container 50, wherein containers 50 and 50' have different volumes of available ink. These may have different fill levels or even be of multiple sizes. The color containers 50 may contain other colorants (red, green, blue) or colorant concentrations as well. There might be a high volume version of a color ink container 50 for high density and/or more frequent color printing and a lower volume 50' version for lower density and/or less frequent printing.

In a preferred embodiment, all of the ink containers 12 are the same height to make it easier to install them and to make the supply station 14 more compact. The size of the supply station impacts overall printing system size, which needs to be kept at a minimum to preserve desktop space and provide a lower printing system cost. Ink container 12 is therefore adapted to allow multiple widths of ink container 12 to be plug compatible with receiving station 14 while providing containers of uniform height.

Figure 3:
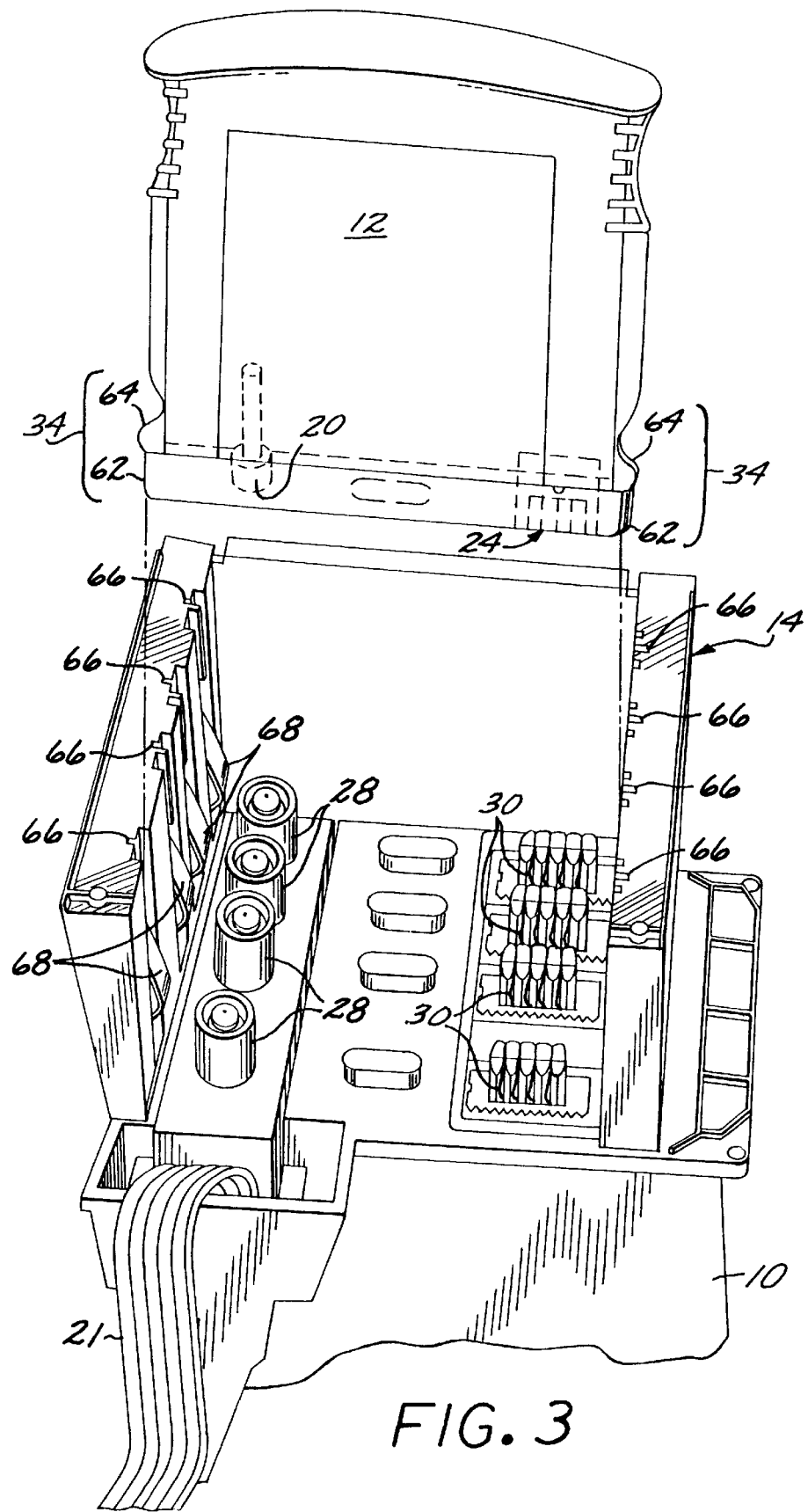
FIG. 3 is an ink supply receiving station of the type used in the printing system of FIG. 2, shown broken away, with an ink container positioned for insertion into the ink supply receiving station.

Turning to FIG. 3, ink container 12 is shown positioned for insertion into a container receiving station 14. The plurality of container positioning features 34 include aligning features 62 and latching features 64. The aligning features 62 are configured to engage corresponding guiding features 66 to guide ink container 12 into the receiving station 14. The aligning features 62 are preferably positioned on opposite sides of the ink container 12. Positioning the aligning features on opposite ends of cartridge 14 eliminates any need for partition walls between cartridges 12 during insertion. Not having partition walls allows for a lower cost and more compact ink supply station 14.

Ink container 12 has an elongate cross section perpendicular to the direction of its insertion into receiving station 14. Aligning features 62 are positioned at opposite ends of the elongate cross section, with the elongate shape of ink container 12 maximizing the distance between the aligning features 62. Preferably, aligning features 62 are disposed adjacent to a leading edge 72 of ink container 12 relative to a direction of insertion. Placing the features at these locations improves alignment between fluid outlet 20 and fluid inlet 28 and improves alignment between container contacts 24 and receiving station contacts 30.

In order for supply station and ink container parts to be of acceptable cost, they tend to be constructed of molded plastic without extremely precision tolerances (i.e., without perfect dimensional accuracy). Thus, the aligning features 62 on ink container 12 are slightly smaller than the guiding features 66 on receiving station 14. As a result, during installation of ink container 12 into receiving station 14, there is some placement variation between the respective features that engage. The farther these features are from the fluid outlet 20 and the container contacts 24, the more effect angular variations in the supply insertion will affect placement between the fluid outlet 20 and the fluid inlet 28 as well as the between the container electrical contacts 24 and the receiving station electrical contacts 30. Placing the alignment features 62 adjacent to the leading edge 72 minimizes this distance, thereby minimizing such critical placement variation. In addition, maximizing the distance between aligning features 62 minimizes the angular variation of ink container 12 during installation relative to an axis aligned with the direction of installation. Finally, by placing the fluid outlet 20 and the container contacts 24 close to the opposite ends of container 12 further minimizes the distance between the aligning features and the fluid outlet 20 and the container contacts 24, and this further improves alignment accuracy of the fluid outlet 20 to the fluid inlet 28 and the container contacts 28 to the receiving station contacts 30.

Once ink container 12 is properly aligned and inserted into receiving station 14, a latch 68 engages a corresponding latch feature 64 on ink container 12 to latch ink container 12 into a receiving station 14. At such time, the fluid inlet 28, associated with receiving station 14, engages the corresponding fluid outlet 20 on ink container 12 allowing a fluid flow into fluid conduit 21.

Insertion of ink container 12 into receiving station also forms an electrical interconnect between ink container 12 and receiving station 14. More specifically, container electrical contacts 24 associated with the ink container 12 engage corresponding receiving station electrical contacts 30 associated with receiving station 14 to allow information to be transferred between printing system electronics 18 and information storage device 26.

Figure 4A:
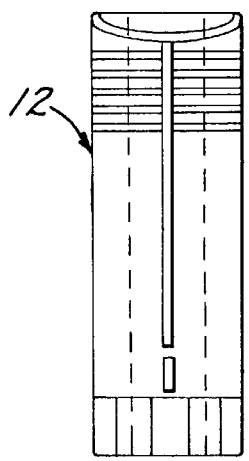
FIGS. 4a, 4b, 4c, 4d, and 4e depict an isometric view of one preferred embodiment of the ink container of the present invention.
Figure 4B:
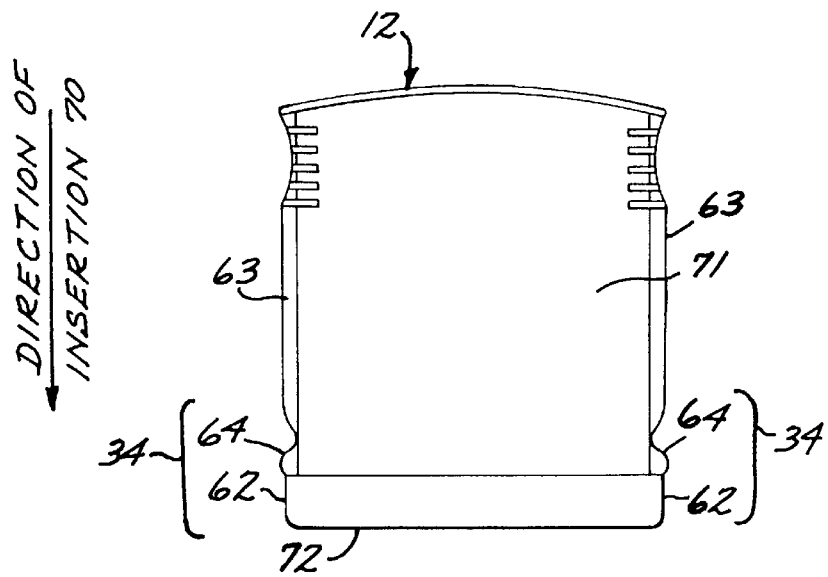
Figure 4C:
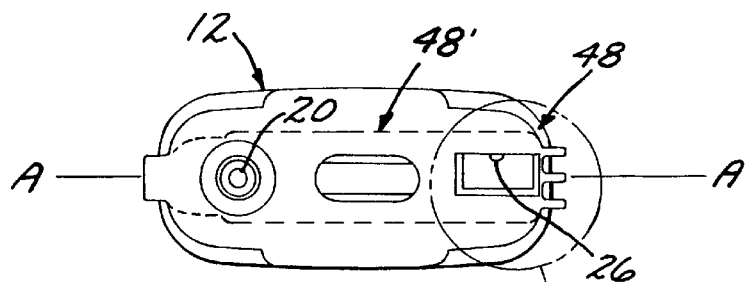
Figure 4D:
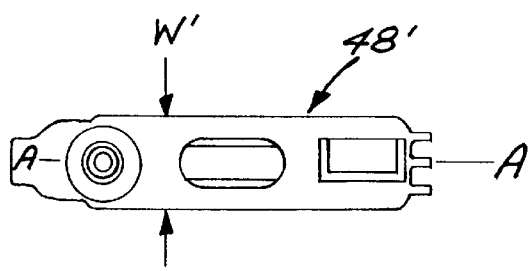
Figure 4E:
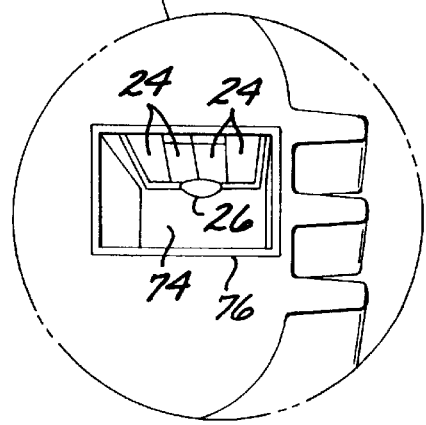

FIGS. 4a–e are isometric views illustrating two sizes of ink container 12. The larger embodiment, shown in FIGS. 4a–d, is the larger ink container 48 discussed with respect to FIG. 2. FIGS. 4a, 4b, and 4c show a side view, a frontal view, and a leading end view of the larger version 48 of ink container 12, respectively. FIG. 4d shows detail of one aspect of FIG. 4c. FIG. 4e illustrates a leading end view of the smaller ink container 48' that is plug compatible with ink container 48. Details in FIG. 4d also apply to FIG. 4e. The dashed outline of FIG. 4c represents the outside surface of smaller container 48'.

Ink container 12 has an elongate cross section perpendicular to a direction of insertion 70 such that the elongate cross section defines an axis of elongation designated as element A. The fluid interconnect 20 and the plurality of electrical contacts 24 are arranged along the axis of elongation A. This allows smaller ink container 48' to have a minimal width W'.

The ink container 12 has first and second sides 63 that are arranged along axis of elongation A. In a preferred embodiment, first and second sides 63 are substantially aligned with the direction of insertion 70. The plurality of container positioning features 34, including alignment features 62 and latching features 64 are arranged on the first and second sides to engage corresponding receiving station positioning features that include guiding features 66 and latch features 68, respectively. With this arrangement, the container positioning features, fluid outlet, and the plurality of container electrical contacts are all arranged along the axis of elongation A. This further allows the minimum size 48' of container 12 to be of minimum width W'.

The fluid outlet 20 and the container contacts 24 are arranged along axis of elongation A and are located toward the first and second sides 63. This minimizes the distance between the fluid outlet 20 and leading edge aligning feature 62 on one side and it minimizes the distance between container contacts 24 and leading edge aligning feature 62 on the other side. As discussed earlier, this improves alignment accuracy between the fluid outlet 20 and the fluid inlet 28 and between the container contacts 24 and the receiving station contacts 30.

The fluid outlet 20 is accessible on a leading edge 72 of ink container 48. Preferably, the axis of elongation A substantially bisects the fluid outlet 20 to further provide for a narrow width supply. The fluid outlet is positioned at the same location relative to the container positioning features 34 for the large ink container 48 and the small ink container 48' to assure that ink containers 48 and 48' are installable or insertable into the same particular location of ink receiving station 14.

As shown in detail in FIG. 4d, the plurality of container electrical contacts 24, also accessible from leading edge 72, are disposed in a cavity 74 to protect the contacts from damage or contamination caused by finger contact, ink, etc. The plurality of container electrical contacts 24 are disposed on a wall aligned with the direction of insertion 70 that allows them to make contact with the receiving station electrical contacts 30 in a sliding action. A rectangular opening 76 provides access to the cavity for receiving station electrical contacts 30. The rectangular opening has a long axis that is aligned with the axis of elongation A to help minimize the minimum width of ink container 12. In using this arrangement, the plurality of electrical contacts 24 are arranged in facing relationship with the axis of elongation A. In addition, the plurality of container electrical contacts 24 are positioned at the same location relative to the container positioning features 34 for the large ink container 48 and the small ink container 48' to assure plug compatibility between ink containers 48 and 48'.

To summarize the concept of plug compatibility, ink containers 48 and 48', having larger and smaller widths respectively, are both installable at a particular location in receiving station 14. Thus, when either container 48 or container 48' is installed, fluid outlet 20 is positioned the same relative to receiving station guiding features 66 such that fluid outlet 20 will properly engage fluid inlet 28. Similarly, when either container 48 or container 48' is installed, container electrical contacts 24 are positioned the same relative to receiving station guiding features 66 such that container electrical contacts 24 will properly engage receiving station electrical contacts 30.

Figure 5:
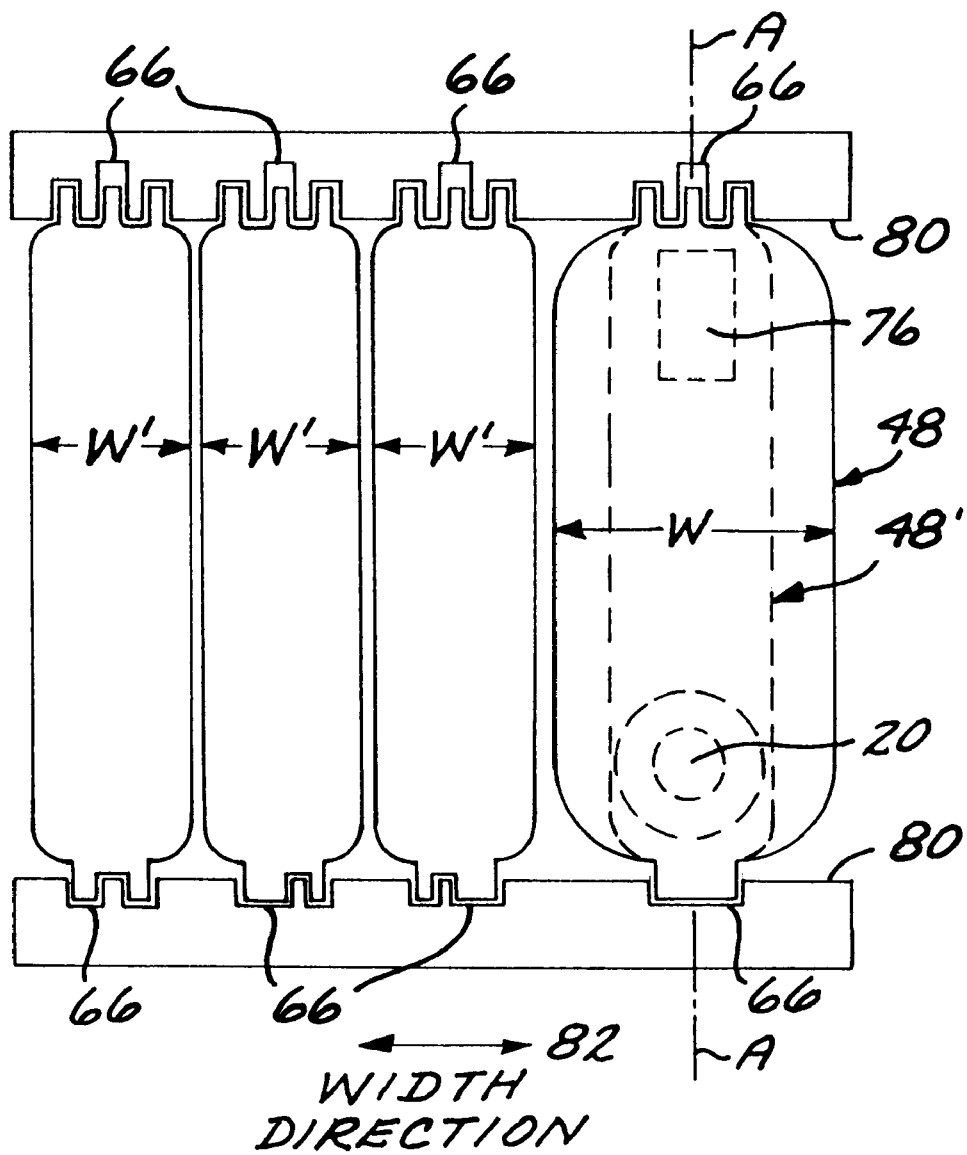
FIG. 5 depicts a simplified section view, partially broken away, of the ink container partially inserted in the ink container receiving station of FIG. 6.

FIG. 5 depicts a sectional view perpendicular to the direction of insertion 70 of a plurality of ink containers 12 taken across aligning features 62 with the containers, at least partially, inserted into the supply station 14. In this figure, the plurality of ink containers 12 includes the larger ink container 48 and the plurality of smaller ink containers 50. Also shown in dashed outline is the smaller ink container 48' that is plug compatible with ink container 48. In one embodiment, ink containers 48 and 48' contain black ink and ink containers 50 container color ink.

This figure illustrates a number of interfacing feature geometries that provide reliable connections between ink container 12 and receiving station 14 and enable multiple ink container widths. The container interfacing features include the positioning features 34, the fluid outlet 20, and the plurality of container electrical contacts 30. The container positioning features 34 include aligning features 62 and latching features 64.

Guiding features 66 are disposed on opposing walls 80 of supply station 14. Outwardly extending aligning features 62 extend into guiding features 66 to provide alignment between ink container 12 and receiving station 14.

Also shown in dashed outline in this figure is the fluid outlet 20 and the rectangular opening 76 that leads to the plurality of container electrical contacts 24. In this view, the plurality of container interfacing features, comprising the fluid outlet, the plurality of electrical contacts, and the container positioning features are projected onto a two dimensional view. In this view, the projected plurality of container interfacing features are all arranged along the axis of elongation A in order to minimize the width of the smaller black container 48'. This allows the widest possible range of plug compatible container widths.

As discussed earlier, axis of elongation A preferably substantially bisects the fluid outlet 20 and passes through the rectangular opening 76 such that the plurality of container electrical contacts 24 each face the axis of elongation A.

To assure plug compatibility between containers 48 and 48', the fluid outlet 20 and the container electrical contacts 24 are positioned at the same location along the axis of elongation for either container 48 or 48'.

Axis of elongation A is located roughly at the center of the guiding features 66 when the larger ink container 48 is installed in receiving station 14. This allows the ink container 12 width to be varied in a symmetrical manner.

Ink containers 12 are arranged along a width direction in a side-by-side manner in receiving station 14. These locations are variably spaced to accommodate a range of ink container widths. In this example, ink containers 48 and 48' have a maximum width of W. On the other hand, ink containers 50 have a maximum width of W'. Thus, the spacing between locations for ink containers 50 is just over W', whereas the spacing between the location for ink containers 48 and 48' is increased to accommodate the greater width W.

FIG. 6 depicts a block diagram of a preferred embodiment of ink jet printing system 10. Controller or printing system electronics (which, in the case of a typical printer, include a computer, a printer driver, and printer firmware electronics) 18 control the operation of printing system 10. Ink container 12 has an information storage device or memory element 26 thereon that provides information to printing system 10 indicative of a volume of ink.

This information provided by the information storage device includes parameters that are indicative of the available ink in ink container 12. In this preferred embodiment, the parameters include a first parameter that is indicative of initial available volume of ink contained in ink container 12 and a second parameter that is indicative of an amount available of ink remaining in ink container 12. Initially, the second parameter is indicative of a full ink container, i.e., it is indicative of a volume of ink equal to the initial volume of ink.

In this example, the first parameter is represented by a binary encoded value that is proportional to the initial volume of ink in container 12. The first parameter can be encoded in a variety of other ways. As a second example, the parameter could be one that is an encoded number that is accessed by the printing system which then determines an amount of available ink by comparing the encoded number with a lookup table. For the simplest lookup table example, the first parameter could just indicate a large supply or small supply for a printing system that accepts only two supply sizes. The large supply could be indicated by a one and a small supply by a zero. The system, upon reading the value, would have pre-programmed an expected initial available volume of ink for use in ink usage calculations.

In the immediate example, the second parameter is a binary number that is proportional to the fraction of available ink left in the ink container. Again, this does not have to be the case; other ways of doing this such as the aforementioned lookup table (a lookup table of fill states or available ink states) could be used.

As printing takes place, printhead 16 ejects ink onto media. Each droplet of ink has a certain drop volume, that is determined by controller 18. Controller 18 can determine this drop volume by reading a drop volume parameter from a printhead memory element 90. Controller 18 periodically calculates the amount of ink ejected by printhead 16 for some amount of time or printing. This is normally done by multiplying a calculation of the average drop volume by an amount of drops ejected to obtain an incremental volume of ink. Controller 18 then subtracts this incremental volume from the current value of the amount of ink remaining in ink container 12 to obtain a new value for amount of ink remaining. The second parameter on memory element 26 is then updated to reflect the current remaining ink volume.

As explained above, the first and second parameters are indicative of initial and current volumes of ink contained in ink container 12. However, for reliability reasons, this may not be the case. There is always some amount of error in the calculation discussed above. For example, printhead 16 may eject ink at a slightly faster rate than the assumed value. Thus, it would be preferable that first and second parameters indicate a lesser amount of ink to assure printhead 16 is never activated without a steady supply of ink.

In another embodiment, the information storage device stores a third parameter indicative of the type of ink contained in reservoir 22. A difference in ink type refers to any aspect that would make two inks non-identical or different (e.g. different colors, densities, solvents, pigment or dye colorant type, surfactants, etc.). A change in the ink from a first ink type to a non-identical second ink type will tend to affect the volume of drops ejected from printhead 16 and hence the rate of ink usage. Thus, for such a change, the system should compensate by changing the correlation of ink usage versus number of drops ejected from printhead 16.

Tracking the amount of ink remaining serves a number of functions. The printing system user can be notified of remaining ink over time. One way to do this is to provide an ink level gauge that indicates an ink level for each colorant in the printing system. The ink level gauge can be displayed on the printer chassis or upon a computer screen that is interconnected with the printing system. When the ink container 12 reaches a low ink level, the user can be notified, allowing the user to acquire another ink container before the reservoir 22 becomes fully depleted. Finally, when ink container 12 becomes empty of deliverable ink, printing can be automatically stopped to prevent printer damage. Note that providing these functions requires prior knowledge of the available ink volume within the ink container.

It should be understood that the foregoing description is only illustrative of the invention. Various alternatives and modifications can be devised by those skilled in the art without departing from the invention. For example, although a particular printer was shown, this invention could be embodied in any ink jet printing system, including color copiers, office or home printers, large format CAD (computer aided design) printers, and web printers. The example shown had a black ink container with large and small sizes. However, this invention could be used in other printing systems where color ink containers need to have multiple sizes. Accordingly, the present invention is intended to embrace all such alternatives, modifications, and variances which fall within the scope of the appended claims.

What is claimed is:

1. A replaceable ink container to be installed at a particular location in a receiving station of an ink jet printing system, said receiving station providing ink from said replaceable ink container to a printhead, said replaceable ink container comprising:

a housing having an axis of elongation perpendicular to a direction of insertion of said replaceable ink container into said receiving station;

an ink supply within said housing, said ink supply containing a volume of ink;

a fluid outlet on said housing along said axis of elongation, said fluid outlet being connected to said ink supply such that when said replaceable ink container is fully installed at said particular location in said receiving station, said fluid outlet engages a corresponding fluid inlet at said particular location in said receiving station to allow ink to flow from said ink supply of said replaceable ink container to said printhead;

an information storage device on said housing, said information storage device storing information indicative of said volume of ink within said ink supply;

a plurality of container electrical contacts on said housing along said axis of elongation, said plurality of container electrical contacts being connected to said information storage device such that when said replaceable ink container is fully installed at said particular location in said receiving station, said plurality of container electrical contacts engage corresponding receiving station electrical contacts to electrically couple said information storage device to said ink jet printing system, wherein said fluid outlet and said plurality of container electrical contacts are positioned on said axis of elongation to allow said replaceable ink container to be fully installed at said particular location in said receiving station.

2. The replaceable ink container of claim 1, and further including:

a plurality of container positioning features on said housing, said plurality of container positioning features engaging corresponding receiving station positioning features to position said replaceable ink container at said particular location in said receiving station to provide a reliable fluidic connection between said fluid outlet and said corresponding fluid inlet, and a reliable electrical connection between said plurality of container electrical contacts and said corresponding receiving station electrical contacts.

3. The replaceable ink container of claim 1, wherein said axis of elongation substantially bisects said fluidic connection.

4. The replaceable ink container of claim 1, wherein said axis of elongation passes through said fluidic connection, and wherein an outer surface of said housing is substantially symmetrical with respect to said axis of elongation.

5. The replaceable ink container of claim 1, wherein said housing has first and second sides on said axis of elongation, and wherein said plurality of container positioning features are on said first and second sides.

6. The replaceable ink container of claim 5, wherein said first and second sides are substantially aligned with said direction of insertion.

7. The replaceable ink container of claim 5, wherein said receiving station has opposing walls, wherein said corresponding receiving station positioning features include guiding channels on said opposing walls, and wherein said plurality of container positioning features include outwardly extending aligning features that extend into said guiding channels.

8. The replaceable ink container of claim 7, wherein said aligning features are positioned to align said replaceable ink container such that said axis of elongation is substantially centered within said guiding channels when said replaceable ink container is fully installed at the particular location in said receiving station.

9. The replaceable ink container of claim 1, wherein each of said plurality of container electrical contacts face toward said axis of elongation.

10. The replaceable ink container of claim 1, wherein said information indicative of the volume of ink within the ink supply includes at least one parameter indicative of a calculated volume of available ink contained in said ink supply.

11. The replaceable ink container of claim 10, wherein said at least one parameter includes first and second parameters, wherein said first parameter is indicative of a calculated initial volume of available ink in said ink supply, and wherein said second parameter is indicative of a calculated volume of ink remaining in said ink supply.

12. The replaceable ink container of claim 11, wherein said calculated volume of ink remaining in said ink supply is less than or equal to said calculated initial volume of available ink in said ink supply.

13. The replaceable ink container of claim 10, wherein said at least one parameter indicative of a calculated volume of available ink contained in said ink supply is a binary number interpreted by said ink jet printing system to be proportional to a volume of deliverable ink.

14. A system of ink containers for use in a printing system, said printing system having a printhead under control of printing system electronics, said printing system having a receiving station for receiving the system of ink containers, said receiving station having receiving station positioning features, and a fluid inlet in fluid communication with said printhead, said system of ink containers comprising:
- a first ink container installable in a particular location of said receiving station, said first ink container containing a first quantity of ink, said first ink container including:
  - a first housing having a first axis of elongation;
  - a plurality of first container positioning features on said first housing along said first axis of elongation, said first container positioning features being engageable with said receiving station positioning features to position said first ink container in said particular location of said receiving station;
  - a first fluid outlet connectable to said fluid inlet in said receiving station; and
  - a first information storage device electrically connectable to said printing system, said first information storage device storing information indicative of said first quantity of ink; and
- a second ink container installable in said particular location of said receiving station, said second ink container containing a second quantity of ink wherein said second quantity of ink is different from said first quantity of ink, said second ink container including:
  - a second housing having a second axis of elongation;
  - a plurality of second container positioning features on said second housing along said second axis of elongation, said first container positioning features being engageable with said receiving station positioning features to position said second ink container in said particular location of said receiving station;
  - a second fluid outlet connectable to said fluid inlet in said receiving station; and
  - a second information storage device electrically connectable to said printing system, said second information storage device storing information indicative of said second quantity of ink.

15. The system of ink containers of claim 14, wherein said first ink container and said second ink container are of different dimensional sizes.

16. The system of ink containers of claim 15, wherein said first and second ink containers have first and second widths perpendicular to a direction of insertion of said first and second ink containers into said particular location of said receiving station, and wherein said first and second widths are different.

17. The system of ink containers of claim 14, wherein said first quantity of ink is of a first ink type, wherein said second quantity of ink is of a second ink type, and wherein said first ink type is different than said second ink type.

18. A printing system, comprising:
- a printhead for selectively depositing ink droplets onto media;
- a receiving station for providing ink to said printhead, said receiving station having a plurality of variably spaced receiving station positioning features for accommodating a plurality of ink containers of varying widths;
- an ink container adapted for installation in a particular feature of said plurality of variably spaced receiving station positioning features in said receiving station, said ink container including:
  - a housing;
  - a plurality of container positioning features on the housing, said container positioning features being engageable with said particular feature of said plurality of variably spaced receiving station positioning features to position said ink container in said receiving station; and
  - an information storage device in said housing; and
- a controller linked to said receiving station of said printing system, said controller reading information indicative of a volume of ink within said housing from said information storage device.

19. The printing system of claim 18, further comprising a further ink container that is engageable with said particular feature.

20. The printing system of claim 19, wherein said ink container contains a first volume of available ink, and wherein said further ink container contains a second volume of available ink that is different than said first volume of available ink.

21. The printing system of claim 19 wherein said ink container contains a first ink type, and wherein said further ink container contains a second ink type that is different than said first ink type.

22. The printing system of claim 18, wherein said printhead is mounted in a scanning carriage and wherein said receiving station is stationary relative to said scanning carriage.

23. A method of providing ink to a printhead in an inkjet printing system, the printhead receiving ink from a fluid inlet in a receiving station, comprising:
a) selecting an ink container from a plurality of ink containers, said plurality of ink containers containing different volumes of deliverable ink, wherein each ink container of said plurality of ink containers includes a housing having an axis of elongation perpendicular to a direction of insertion of said each ink container into said receiving station, an ink supply, a fluid outlet on said housing along said axis of elongation, and a plurality of container electrical contacts on said housing along said axis of elongation;
b) fluidically coupling said fluid outlet of said ink container to said fluid inlet;
c) providing information to said printing system indicative of a volume of deliverable ink within said ink supply; and
d) providing ink from said ink supply to said printhead.

24. The method of claim 23, wherein said each ink container of said plurality of ink containers is insertable in a particular location of said receiving station, and wherein said fluid outlet of said each ink container engages said fluid inlet when said each ink container is inserted in said particular location.

25. The method of claim 24, wherein said each ink container has an information storage device connected to said plurality of container electrical contacts, said information storage device providing said information indicative of said volume of deliverable ink to said printing system when said each ink container of said plurality of ink containers is inserted in said particular location.

26. The method of claim 23, wherein said each ink container of said plurality of ink containers has a different dimensional size.

27. The method of claim 26, wherein said each ink container of said plurality of ink containers has a different width.

28. The method of claim 23, wherein said plurality of ink containers contain different types of ink.

29. The method of claim 23, further comprising:
uncoupling said fluid outlet of said ink container from said fluid inlet;
refilling said ink supply of said ink container; and
fluidically recoupling said fluid outlet of said ink container to said fluid inlet.

* * * * *

UNITED STATES PATENT AND TRADEMARK OFFICE
CERTIFICATE OF CORRECTION

PATENT NO. : 5,956,057
DATED : September 21, 1999
INVENTOR(S) : Winthrop D. Childers, et al.

It is certified that error appears in the above-identified patent and that said Letters Patent is hereby corrected as shown below:

First page, Column 2, line 22, "Sillivan" should read -- Sullivan --;

Signed and Sealed this

First Day of May, 2001

*Attest:*

NICHOLAS P. GODICI

*Attesting Officer*     *Acting Director of the United States Patent and Trademark Office*